United States Patent [19]
Johnson et al.

[11] Patent Number: 5,596,473
[45] Date of Patent: Jan. 21, 1997

[54] ELECTRICAL SWITCHES WITH CURRENT PROTECTION INTERFACED WITH A REMOTE STATION AND A PORTABLE LOCAL UNIT

[75] Inventors: Richard A. Johnson, Aliquippa; Joseph C. Engel, Monroeville; Michael F. Boccabella, North Huntingdon; David M. Oravetz, Coraopolis; James I. Wise, Zelienople, all of Pa.

[73] Assignee: Eaton Corporation, Cleveland, Ohio

[21] Appl. No.: 384,728

[22] Filed: Feb. 6, 1995

[51] Int. Cl.⁶ .................................................. H02H 3/00
[52] U.S. Cl. ............................. 361/97; 361/64; 361/115
[58] Field of Search .............................. 361/91, 97, 96, 361/66, 64, 62, 42, 45, 115, 23, 24, 93; 364/492, 493

[56] References Cited

U.S. PATENT DOCUMENTS

| | | | |
|---|---|---|---|
| 4,747,061 | 5/1988 | Lagree et al. | 364/483 |
| 4,751,605 | 6/1988 | Mertz et al. | 361/91 |
| 4,870,531 | 9/1989 | Danek | 361/93 |
| 4,958,252 | 9/1990 | Murphy | 361/93 |
| 5,101,316 | 3/1992 | Levain | 361/93 |
| 5,270,898 | 12/1993 | Elms et al. | 361/96 |
| 5,309,312 | 5/1994 | Wilkerson et al. | 361/79 |

FOREIGN PATENT DOCUMENTS

PCT/US92/
10250 6/1993 WIPO ............................. H02H 3/00

*Primary Examiner*—Jeffrey A. Gaffin
*Assistant Examiner*—Stephen W. Jackson
*Attorney, Agent, or Firm*—Martin J. Moran

[57] ABSTRACT

An electrical switch with overcurrent protection communicates as a slave with a remote master station by sending return messages to the remote master station only in response to messages addressed to it. A portable unit plugs into the electrical switch and disables communications between the electrical switch and the remote master station. The portable unit then establishes communications with the electrical switch by sending a global message to the electrical switch requesting the unique address at successive baud rates until a return message containing the electrical switches' address is received. A communications module in the electrical switch transfers to a master mode in response to the global message in order to send the return message containing its unique address. It then reverts to the slave mode for response to subsequent messages from the portable unit containing the unique address. Either the remote master station or the portable unit can test the circuit breaker by sending a message containing a digital test current to the circuit breaker.

4 Claims, 4 Drawing Sheets

ELECTRICAL SWITCHES WITH CURRENT PROTECTION INTERFACED WITH A REMOTE STATION AND A PORTABLE LOCAL UNIT

BACKGROUND OF THE INVENTION

1. Field of the Invention

This invention relates to electrical switches with current protection, such as circuit breakers, motor starters, motor controllers, transfer switches and the like, having communications connections for communicating with a remote station on a network, and alternatively, with a local portable unit.

2. Background Information

State of the art electrical switches with overcurrent protection, such as circuit breakers, motor staffers, motor controllers and transfer switches for example, utilize a microcomputer for performing various protection functions. The microcomputers in these devices also provide them with the capability of monitoring various parameters in the protected circuit, such as the current, power, energy, voltage, and, in some cases harmonic distortion and other parameters. Typically, such devices have incorporated manually operated switches for selecting various functions and parameter settings. In some instances, the individual units have been linked to a remote unit, at first through dedicated wiring and more recently through a network, for remote monitoring of the circuit breaker, and in some instances, for remotely operating the circuit breaker.

In a typical arrangement, the remote station is operated as a master station and the individual electrical switches are operated as slaves. In such an arrangement, the master station communicates with the individual devices over the network by sending messages uniquely addressed to the individual devices. The individual devices only reply to messages specifically addressed to them. In some instances, the master station may send a global message to all the stations which does not require a reply, such as a timing signal or a command to calculate power.

The switches for setting the various parameters on the electrical switches require room in the device as does a display for displaying the parameters and calculated values. There is a need for improved arrangement for setting and monitoring parameters and calculated values in microcomputer-based electrical switches which require less room in the device. At the same time there is a need for maintaining the integrity and security of the protection functions of the device.

SUMMARY OF THE INVENTION

These needs and others are satisfied by the invention which is addressed to the combination of an electrical switch with overcurrent protection, remote station means, and communications means between the electrical switch and the remote station means by which messages are exchanged between the electrical switch and the remote station means. The remote station means acts as a master and the electrical switch acts as a slave so that the electrical switch will only transmit messages in response to messages addressed uniquely to it.

A portable unit plugs into the electrical switch and has linking means through which the portable unit can communicate with the electrical switch. This linking means simultaneously disables communications between the electrical switch and the remote station means. The portable unit establishes communications with the electrical switch by sending a global message requesting the address of the electrical switch. The electrical switch sends a return message containing its address which is then used by the portable unit for further communications.

The communications means includes a network between the electrical switch and the remote station means and a communications module in the electrical switch which is connected to the network. The linking means of the portable unit plugs into this communications module. The communications module has a slave mode in which it receives messages addressed to it and global messages without any address, but it will only send a return message in response to a message addressed to the electrical switch. The communications module also has a master mode in which it can initiate messages. When the global message is received from the portable unit requesting the address of the electrical switch, the communication module transfers to the master mode in order to send the return message containing the unique address. It then switches back to the slave mode for further communications with the portable unit. As another aspect of the invention, either the portable unit or the remote station can run a test of the electrical switch by sending a digital test current to the switch using the network protocol.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

The invention will be described as applied to an electrical switch in the form of a circuit breaker; however, it will be appreciated by those skilled in the art that it has application to other electrical switches incorporating overcurrent protection and which communicates with a remote station through a communications network.

Figure 1:
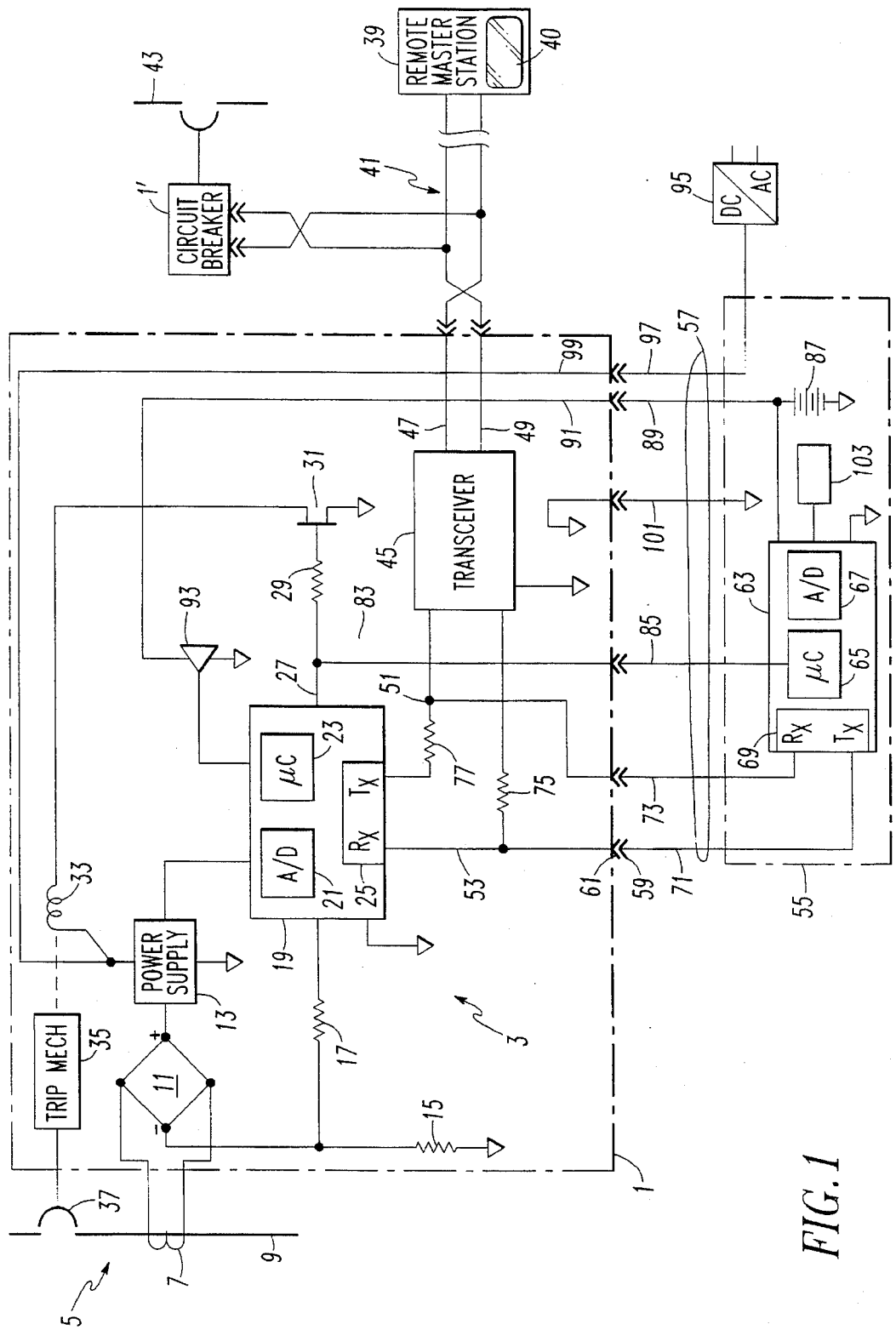
FIG. 1 is a schematic circuit diagram of a combination in accordance with the invention.

Referring to FIG. 1, the circuit breaker 1 includes an electronic trip unit 3 which monitors current flowing in the protected electrical system 5 through a current transformer (CT) 7. A single phase electrical system 5 is depicted for clarity of illustration; however, the invention also applies to circuit breakers used with multiphase electrical systems 5, and typically three phase electrical systems.

The CT 7 produces an ac current signal proportional to the current flowing in the conductor 9 of the electrical system 5. This ac current signal is full wave rectified by the rectifier bridge 11. The resultant dc current feeds a power supply 13 for the circuit breaker. The analog dc current, which is proportional to the current in the conductor 9, is converted to a voltage by the resistor 15 and applied through an input resistor 17 to an integrated circuit (IC) 19. This integrated circuit 19 includes an analog to digital (A/D) converter 21, a microcomputer 23, and a communications module 25. This integrated circuit 19 is described in detail in U.S. Pat. No. 5,270,898 which is hereby incorporated by reference.

The microcomputer 23 of the integrated circuit (IC) 19 runs programs which implement selected protection functions typical for a circuit breaker such as, for instance, any one or more of instantaneous protection, long delay protection and short delay protection. If the current in the conductor 9 exceeds any of the current/time characteristics of the selected protection functions, a trip signal is generated on the lead 27. This trip signal is applied through a resistor 29 to the gate of a FET 31. The trip signal turns on the FET 31 so that a trip solenoid 33 is energized by the power supply 13. When energized, the solenoid 33 actuates a trip mechanism 35 which opens separable contacts 37 in interrupt current in the conductor 9.

The circuit breaker 1 is linked to a remote master station 39 through a network 41. Additional circuit breakers 1' providing protection on other conductors such as conductor 43 in the electrical system 5 can also be connected to the remote master station 39 through the network 41. Network 41 consists of lengths of twisted wire pairs which interconnect the remote master 39 to a number of slave devices such as circuit breaker 1. The circuit breaker 1 includes a transceiver 45 which isolates the communication module 25 within the circuit breaker from the leads 47 and 49 of the network 41. Leads 51 and 53 extend between the transceiver 45 and the transmit ($T_x$) and receives ($R_x$) ports, respectively, of the communications module 25.

The circuit breakers 1 communicate with the remote station 39 over the network 41 with the remote station acting as the master station and the several circuit breakers 1 acting as slaves. In this arrangement, each of the circuit breakers 1 has a unique address. The master station communicates with the individual circuit breakers 39 by sending messages containing the unique address of the circuit breaker to which the message is dispatched. The circuit breakers 1 being slaves will only launch a message on the network 41 in response to a message addressed to it. Thus, the individual circuit breakers 1 can only communicate with the master station 39 while the master station can communicate with each of the circuit breakers. The messages sent by the circuit breakers 1 all contain the unique identifiers of the circuit breaker so that the master station knows the source of each message in the slave mode.

The master station 39 can also launch a broadcast or global message on the network which does not identify the address of any specific circuit breaker 1. The circuit breakers 1 and 1' all receive these global messages and can respond internally to them, but they can not launch a message on the network 41 in response to a global message.

The master station 39 can request information from the individual circuit breakers such as: status (tripped/not tripped), phase currents, and other parameters if monitored by the circuit breaker 1 such as, power, energy, and harmonic distortion. For instance, the master station 39 can also read the rating and various trip parameters of the individual circuit breakers. In some installations, it may also set the various trip parameters. This includes selecting the protection function such as instantaneous, short delay, and long delay, as well as setting the pick-up values and time intervals. If desired, the master station can send a message opening a particular circuit breaker, and if the circuit breaker is provided with a recloser, reclosing the circuit breaker. The remote master station has a display 40 on which the various parameters can be reviewed and adjusted by an operator.

The master station 39 may be, for instance, a computer located remotely from the circuit breakers 1, or a microcomputer based controller mounted in a panel with the circuit breakers. In any case, the master station communicates with each of the circuit breakers 1 over the network 41.

In accordance with the invention, a hand-held portable unit 55 may be temporarily linked individually with any of the circuit breakers 1 such as through a cable 57 having a plug-in connector 59 which mates with a connector 61 in the circuit breaker 1.

The hand-held portable unit 55 contains an IC 63 similar to the IC 19 in the circuit breaker. This IC 63 also contains a microcomputer 65, an A/D converter 67 and a communication module 69. A pair of leads 71 and 73 connect the $T_x$ and $R_x$ ports of the communications module 69 in the hand-held portable unit 55 with the $R_x$ and $T_x$ ports, respectively, in the communications module 25 of the circuit breaker 1 through the connectors 59 and 61. This permits the portable unit 55 and the circuit breaker 1 to communicate directly with each other using the network protocol. As the port $T_x$ of the communications module 69 in the portable unit 55 is either at zero or five volts, it controls the signal applied to the $R_x$ input of the module 25, and a resistor 75 between lead 53 and the transceiver 45 blocks receipt by the circuit breakers of messages sent by the remote master station 39 over the network 41. A resistor 77 is connected between the $T_x$ output of module 25 and the transceiver 45. The lead 73 to the $R_x$ input of module 69 clamps the $T_x$ signal from module 25 to a level below the input threshold of the transceiver 45. Thus, connection of the communications module 25 of the circuit breaker 1 to the network 41 is automatically disabled when the portable unit 55 is plugged into the circuit breaker. Communications with the remote station 39 is reenabled automatically by disconnection of the portable unit 55 from the circuit breaker.

One of the messages that the portable unit 55 can send to the circuit breaker 1 contains a digital test current value. This digital test current value is processed by the IC 19 the same as the digital conversion of current sensed by the CT 7. If this test current is above the pick-up value of one of the protection functions of the circuit breaker 1, it will generate a trip signal on the lead 27 after the appropriate time interval. This trip signal is sent back to the portable unit 55 over a lead 83 in the circuit breaker connected to a dedicated lead 85 in the cable 57 through the connectors 61 and 59. The microcomputer 65 in the portable unit 55 can time the interval between the sending of the test current signal and the receipt of the trip signal to verify the trip functions. In addition, the microcomputer 23 of the circuit breaker 1 times the interval from the beginning of the test to the generation of a trip signal. This is a more accurate measure of the time to trip. The portable unit 55 can retrieve this time over the communications link. The portable unit can repetitively send status request messages to the circuit breaker which returns a tripped/not tripped response. When a tripped response is received, the portable unit can request the time to trip which is sent by the circuit breaker in a return message. Preferably, in place of maintaining its own test time, the portable unit 55 can repetitively interrogate the circuit breaker's microcomputer 23 for its test running time. A test can be remotely run by the remote master station 39 in a similar manner, except that there is no dedicated line to signal the generation of a trip signal.

As mentioned, the circuit breaker is normally powered from a power supply 13 which draws power from the protected electrical system 5. Thus, when the contacts 37 are open, the circuit breaker is unpowered. The portable unit 55, therefore, also has a battery 87 which supplies power through a lead 89 in the cable 57 and lead 91 in the circuit breaker to voltage regulator 93 which provides five volt power to the IC 19. In addition, the portable unit 55 has a charger unit 95 which may be plugged into a commercial outlet (not shown) to supply 40 volt dc power through leads 97 and 99 to the trip solenoid 33. Thus, even without power from the protected electrical system 5, the circuit breaker 1 can be fully energized from the portable unit 55. This permits the portable unit to conduct a trip test which also tests the trip mechanism 35 by supplying the 40 volt power to the solenoid 33, or a no trip test in which only the trip signal is generated on the lead 27 by not providing the 40 volt power to the trip solenoid 33. In addition, where power is being supplied to the trip solenoid 33, either from the protected electrical circuit 5 or from the converter 95, actuation of the trip mechanism can be precluded by having the CPU 23 only generate the trip signal internally and not applying it to the lead 27. This internal trip signal can be reported to the portable unit 55 in response to a message sent over the lead 73. A common ground is provided by a lead 101 in the cable 57.

Figure 2:
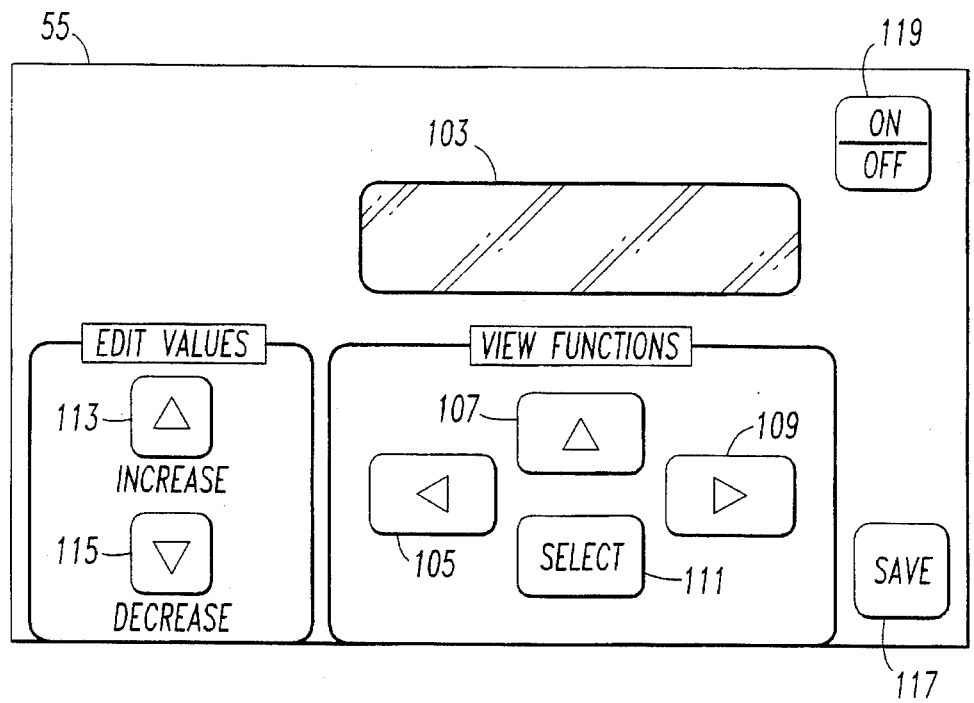
FIG. 2 is a plan view of a portable unit which forms part of the combination shown in FIG. 1.

FIG. 2 is a plan view of the portable unit 55. It is the size of a typical hand-held calculator, about three inches by five inches by one inch. A 2 line, 16 character display 103 presents a menu of available functions. This menu may be scrolled by membrane switches 105,107 and 109. A selected function is implemented by pressing the "select" membrane switch 111. The functions available are the same that are available through the remote station. That is, the values of selected parameters such as currents, power, energy and harmonic distortion can be read out of the circuit breaker, tests can be performed and protection functions can be selected and protection parameters can be set. In the case of setting the test currents and protection variables, the values can be changed by the use of the "increase" and "decrease" switches 113 and 115. Once a value has been set on a display 103 it can be saved by use of the "save" switch 117. The portable unit is turned on and off by the switch 119. A feature of the invention is that the circuit breakers 1 need not have the typical switches for setting the various parameters and for running tests as these functions can be performed by the portable unit 55 or the remote master station 39. Furthermore, the display 103 on the portable unit 55 and 40 on the remote master station 39 make it unnecessary to have a display on the circuit breakers. Elimination of the switches and display from the circuit breakers reduces their cost and size, and can provide room for additional functionality size.

Figure 3:
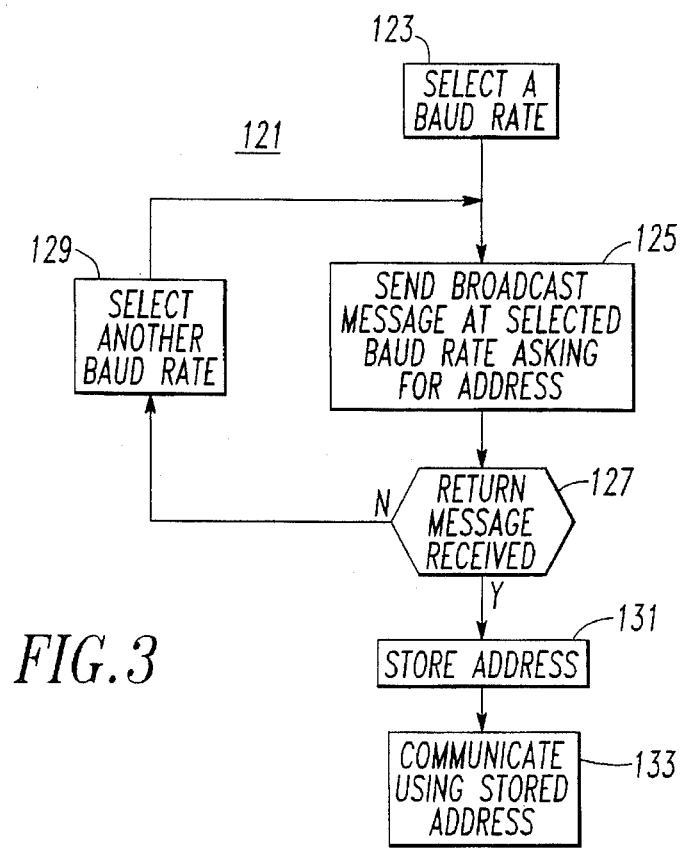
FIG. 3 is a flow chart of a routine used by the portable unit of FIG. 2 to establish communications with the electrical switch which forms part of the combination of FIG. 1.

FIG. 3 illustrates the routine run 121 by the CPU 65 in the portable unit 55 for establishing and maintaining communications with a circuit breaker 1. As indicated above, when the portable unit 55 is plugged into the circuit breaker 1, communications between the circuit breaker 1 and the remote master station 39 are disabled. In establishing communications with the circuit breaker 1 the portable unit 55 must first determine what baud rate the circuit breaker is set to for data transfer. It must then find out the unique address of the circuit breaker to which it is connected.

With this in mind, the routine 121 first selects a baud rate at 123. It then prepares and sends a "broadcast" message requesting the circuit breaker to identify itself as indicated at 125. This message is sent to the circuit breaker at the baud rate selected at 123. If the baud rate selected by the portable unit matches the baud rate set in the circuit breaker 1, the portable unit will receive a message from the circuit breaker identifying its address as indicated at 127. If the portable unit does not receive such a message within a reasonable time, such as 100 ms another baud rate is selected at 129 and the broadcast message is retransmitted at 125 with the new baud rate. This continues until the portable unit receives the message identifying the address of the circuit breaker. This address and baud rate are then stored at 13 1 for future use. In all subsequent communications, the portable unit 55 serves as a master which sends messages at 133 addressed to the circuit breaker which then operates in the slave mode to send reply messages.

Figure 4:
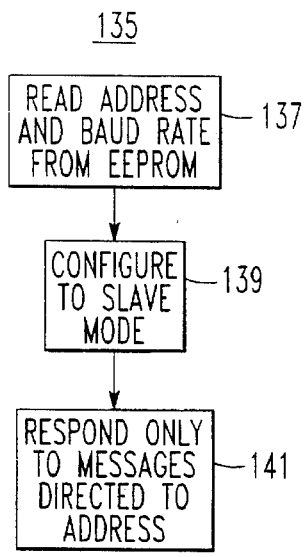
FIG. 4 is a flow chart of a routine used by an electrical switch which forms part of the combination of FIG. 1.

FIG. 4 illustrates a flow chart of a routine 135 used by the circuit breaker for configuring its communications upon start-up. At 137 the circuit breaker reads its address and baud rate from nonvolatile EEPROM memory. It then configures itself at 139 to operate in the slave mode for communications. In this slave mode it only sends response messages to incoming messages directed to its address as indicated at 141. It can also respond internally to broadcast messages.

Figure 5:
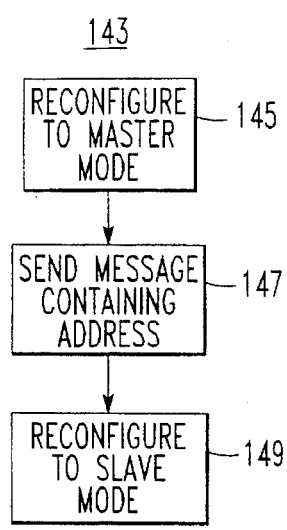
FIG. 5 is a flow chart of a routine used by the electrical switch to establish communications with the portable unit.

FIG. 5 illustrate a flow chart of a routine 143 used by the circuit breaker 1 when it receives a broadcast message from the portable unit 55 requesting its address. Upon receipt of this message, the circuit breaker reconfigures its communications for operation in the master mode at 145. While operating in this master mode, the circuit breaker sends a message at 147 to the portable unit containing its address, and then reconfigures at 149 to operate in the slave mode.

Figure 6:
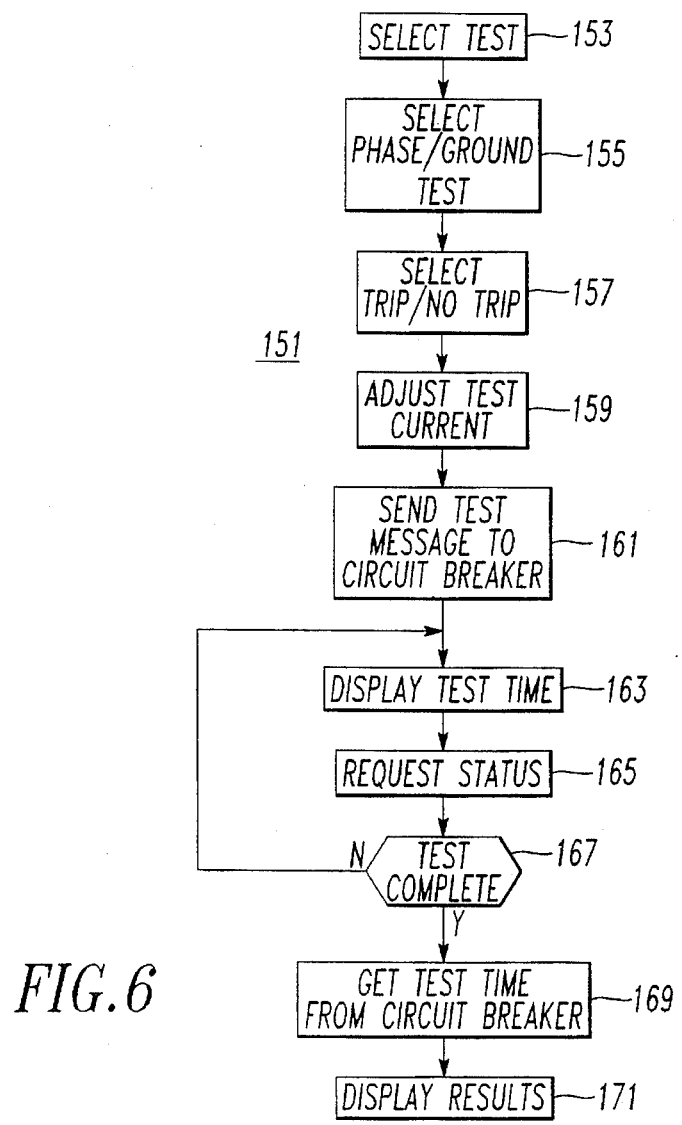
FIG. 6 is a flow chart of a routine used by either the portable unit or master station to initiate a test of the electrical switch.

FIG. 6 is a flow chart 151 utilized by either the remote master station 39 or the portable unit 55 acting as a master station to initiate a test of the trip unit 3 of the circuit breaker 1. When the test program is selected at 153, the operator can selectively run a phase test or ground test at 155. Furthermore, the operator can select whether the contacts are to be opened by selecting "trip" or whether only the electronic unit is to be tested by selecting "no trip" at 157. A test current value is then selected at 159. A test message is then sent to the trip unit containing the above information, as indicated at 161. A timer is then started at 163 with the time displayed on the display 103. This running time represents the time since the test message was sent to the circuit breaker, and therefore, roughly represents the running time of the test. While the test is being run, the portable unit 55 or the master station 39 can repetitively send requests for status to the circuit breaker as indicated at 165. The portable unit 55 can also repetitively request the trip unit test running time for display in place of maintaining its own test time. If the circuit breaker replies that the trip signal has not yet been generated, as indicated at 167 a loop is entered until the trip signal is returned. When an indication is received that the trip signal has been generated, either through a reply to a status message or by signal over line 85, a message is sent at 169 to the circuit breaker requesting the circuit breaker's time to trip. As this time is more accurate than the time presented by the timer indicated at 163, it is displayed on the display 103 as indicated at 171.

Figure 7:
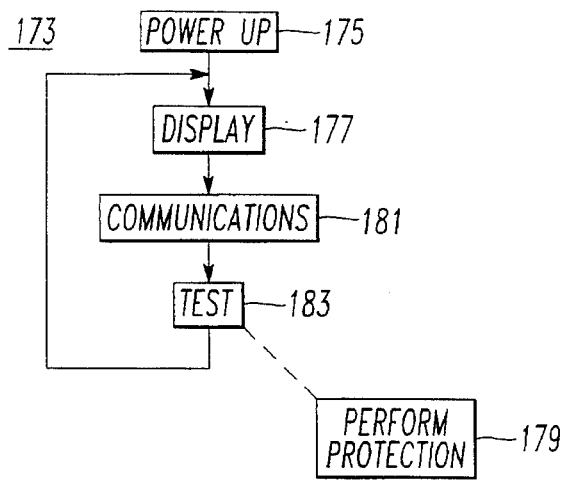
FIG. 7 is a flow chart for the main loop of the electrical switch.

FIG. 7 illustrates a flow chart 173 for the main loop program for the circuit breaker 1. When power is first applied at 175, a number of parameters are initialized and some diagnostic tests are run. The program then enters a continuous loop in which a number of major functions are repetitively performed. For instance, as shown in FIG. 7 the displays (if provided) are serviced at 177. Following this, communications are serviced at 181. This includes receiving the test message from the portable unit 55 or the remote master station 39, responding to the status request, and providing the time to trip when requested. Finally, a test routine is entered at 183. The test routine provides the digital test current value received from the portable unit or remote station for use by the higher priority protection routines 179.

Figure 8:
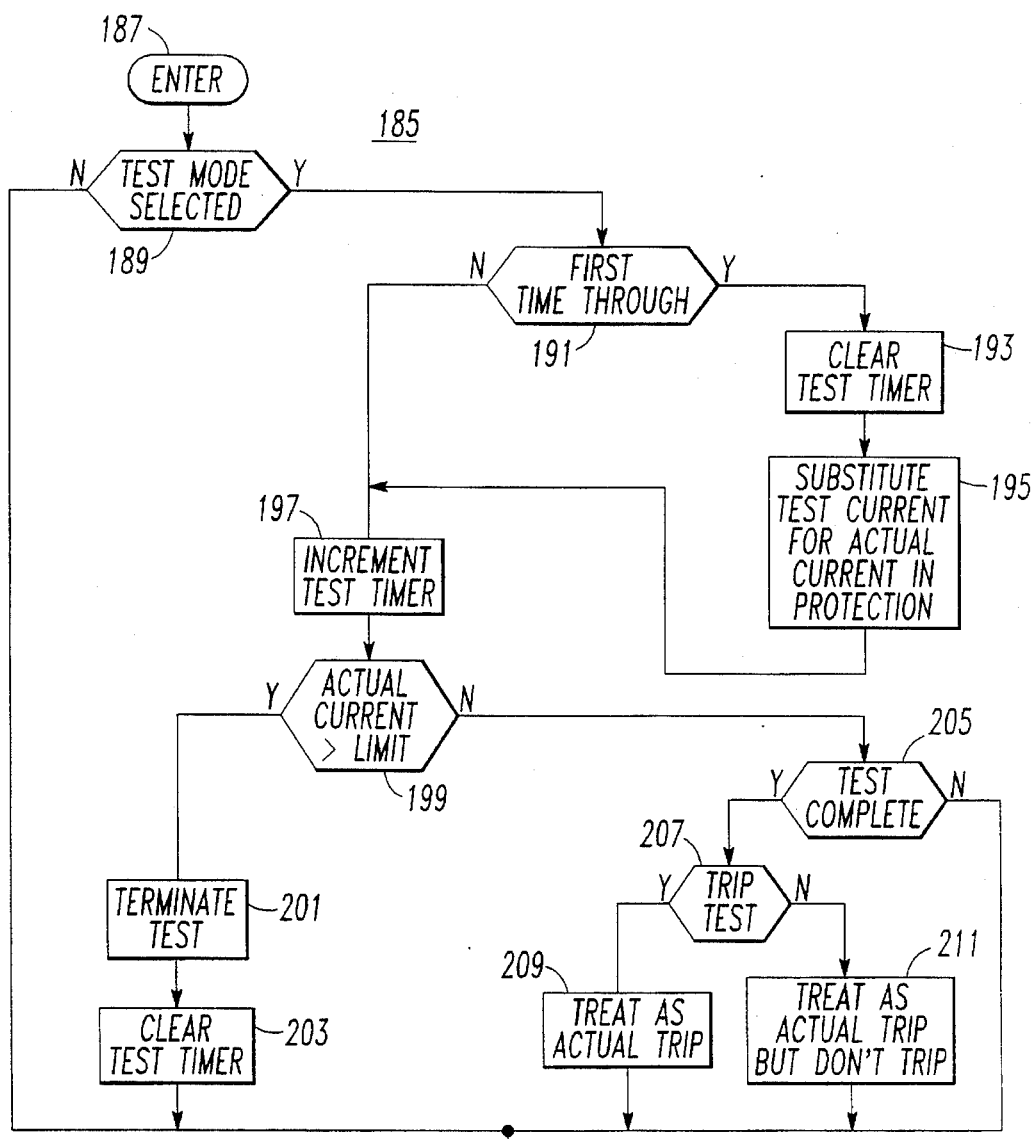
FIG. 8 is a flow chart of a test routine run by the main loop of FIG. 7.

FIG. 8 illustrates a typical test routine 185 for the circuit breaker 1. The routine is entered at 187 and if the test mode has not been selected as determined at 189, the routine is bypassed. The first time through the routine in the test mode as indicated at 191 a test timer is cleared at 193 and the test current is substituted for the actual current at 195. Each time through the routine, the test timer is incremented at 197. This is the timer that provides the time to trip indication.

It is important to maintain the protection functions even when a test is being run. Therefore, the actual current is checked at 199 and if it exceeds a preset limit, the test is terminated at 201 and the timer is cleared at 203. If the actual current remains within limits and the test is not completed, the test routine is exited at 205. As long as a test is being run, and the actual current remains within limits, the protection routine at block 179 in FIG. 7 will be run using the test current value and then the main loop will return to the test routine shown in FIG. 8. When it is determined at 205 that the test has been completed and at 207 that a full test has been selected, the trip signal is output to the FET 31 at 20. If a "no trip" test had been selected, the trip is treated as an actual trip at 211 but the trip signal is not output to the FET 31.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. In combination:

an electrical switch having separable contacts, means generating a digital actual current signal from actual current flowing through said separable contacts, trip signal generating means generating a trip signal in response to values of said digital actual current signal which persist for a time sufficient that a predetermined current/time characteristic is exceeded, and trip means tripping said separable contacts open in response to said trip signal;

a master station separate from said electrical switch; and communications means for sending digital messages back and forth between said electrical switch and said master station, said master station having means generating a digital test message containing a selected digital test current which digital test message is transmitted by said communications means to said electrical switch, and said trip signal generating means having means substituting said digital test current contained in said digital test message for said digital actual current signal for generating a trip signal in response to said digital test current which persists for said time sufficient to exceed said predetermined current/time characteristic.

2. The combination of claim 1 wherein said trip signal generating means includes timer means generating a digital time-to-trip representing a time required for said digital test current to generate a trip signal, and wherein said electrical switch has means generating a digital message containing said digital time-to-trip which is transmitted to said master station over said communications means.

3. The combination of claim 2 wherein said master station operates in a master mode and initiates messages on said communications means and said electrical switch means operates in a slave mode and sends return messages only in response to messages specifically addressed to it, said master station sending repetitive requests for status messages specifically addressed to said electrical switch which said electrical switch responds to by sending a return message indicating whether a trip signal has been generated, and, said master station further sending a request for said time-to-trip when a return message indicating a trip signal has been generated is received by said master station, said electrical switch sending said digital message containing said digital time-to-trip in response to said request.

4. The combination of claim 1 comprising a plurality of electrical switches each having a unique address and each connected by said communication means to said master station, said master station sending digital test messages specifically addressed to the unique address of different ones of said plurality of electrical switches.

\* \* \* \* \*